United States Patent [19] 
Anderson et al.

[11] Patent Number: 4,726,693
[45] Date of Patent: Feb. 23, 1988

[54] PRECISION HYDRODYNAMIC BEARING

[75] Inventors: James C. Anderson, Boise; Roger R. Sleger, Meridian, both of Id.

[73] Assignee: Hewlett-Packard Company, Palo Alto, Calif.

[21] Appl. No.: 658,086

[22] Filed: Oct. 5, 1984

[51] Int. Cl.4 .................. F16C 17/02; F16C 33/02
[52] U.S. Cl. ................... 384/114; 384/291; 384/292
[58] Field of Search ........... 384/100, 120, 115, 111, 384/113, 118, 289, 290, 291, 292, 369, 398, 399, 114, 121, 123

[56] References Cited

U.S. PATENT DOCUMENTS

| | | | |
|---|---|---|---|
| 2,510,549 | 6/1950 | Buchi | 384/398 |
| 2,941,851 | 6/1960 | Bayer | 384/111 |
| 3,337,275 | 8/1967 | Oschen | 384/115 |
| 3,669,517 | 6/1972 | Hughes | 384/115 |
| 3,680,932 | 8/1972 | Raimondi | 384/291 |
| 3,785,708 | 1/1974 | Miyasaki | 384/111 |
| 4,043,612 | 8/1977 | Orcutt | 384/110 |

FOREIGN PATENT DOCUMENTS 449457  6/1936  United Kingdom ............... 384/398

Primary Examiner—Stuart S. Levy
Assistant Examiner—Lynn M. Sohacki
Attorney, Agent, or Firm—Leslie G. Murray

[57] ABSTRACT

A precision hydrodynamic bearing which has a rotatable shaft disposed in the bore of a housing to form an annular gap. The annular includes a journal zone for containing and pressurizing lubricant to facilitate low friction rotation of the shaft and to maintain the annular gap as the shaft rotates.

1 Claim, 3 Drawing Figures

PRECISION HYDRODYNAMIC BEARING

BACKGROUND

High performance rotational devices often require high accuracy, precision bearing parts. For example, in rotating disc memory devices, drive spindles must provide increasingly higher rotational accuracy as track densities become higher. Conventional disc drive spindles use two ball bearings with a magnetic fluid seal. The rotational accuracy of these spindles is determined by the moving ball bearing parts. To achieve the track position accuracy and stability required, disc drive manufacturers typically employ complex head-positioning servo systems. However, these systems are expensive and tend to be unreliable.

SUMMARY OF THE INVENTION

The present invention is an improved hydrodynamic bearing including a rotating shaft for coupling to media in a high speed disc memory device. The bearing can provide high enough rotational accuracy for the shaft to eliminate track following servo apparatus. Primary shaft support is provided by a fully developed hydrodynamic film of lubricating fluid, such as a low viscosity oil, sealed within a bearing housing which, in cooperation with the rotating shaft, including upper and lower oil reservoirs, an oil seal zone, oil feed grooves, an annular feed groove and a journal zone.

This invention introduces a significantly less complex and lower cost bearing apparatus employing fewer parts than in previous devices. Fewer parts also provides increased bearing reliability and longer life. The fluid-film design is also quieter and more energy efficient.

DESCRIPTION OF THE PREFERRED EMBODIMENT

Figure 1A:
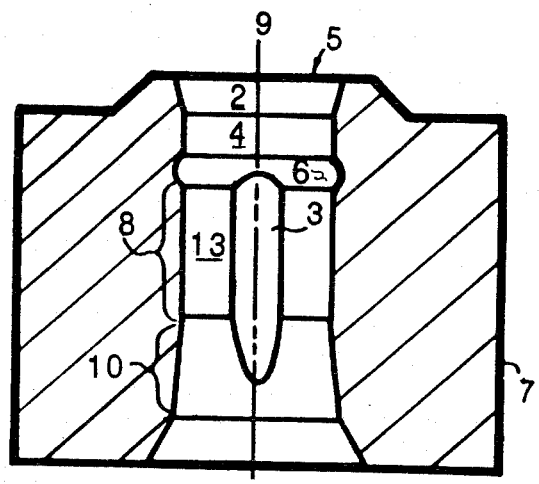
FIG. 1a is an axial cross-sectional view of a bearing housing constructed according to the principles of the present invention.
Figure 1B:
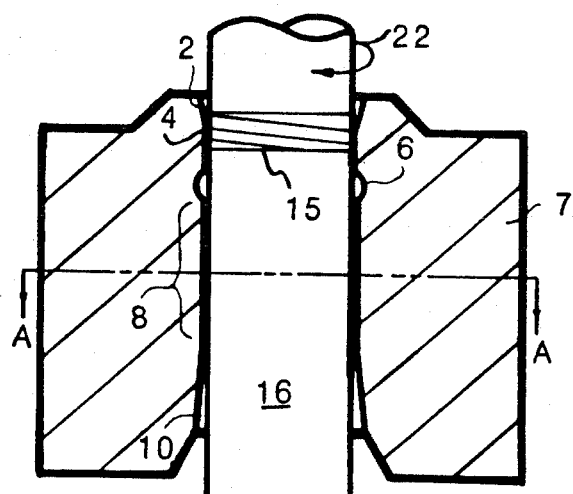
FIG. 1b is an axial cross-sectional view of the bearing housing of FIG. 1a with rotating shaft disposed according to the principles of the present invention.

Referring to FIGS. 1a and 1b, bearing housing 7, having bore 5 axially concentric with longitudinal axis 9, includes upper oil reservoir 2, oil seal zone 4, oil feed grooves 3, annular feed groove 6, journal zone 8 and lower oil reservoir 10 formed in the inner wall of bore 5. Shaft 16, having spiral grooves 15, is retained coaxially in bore 5 so that spiral grooves 15 are positioned substantially in oil seal zone 4 and rotates in direction 22.

The oil employed as the lubricating fluid in the present invention is present throughout the system. When shaft 16 is not rotating, the oil extends from approximately two-thirds of the depth of upper oil reservoir 2 through approximately two-thirds of the depth of lower oil reservoir 10. As shaft 16 rotates, the oil forms a fully developed hydrodynamic film around shaft 16 in journal zone 8, and the oil volume is drained from upper reservoir 2 and is concentrated in lower reservoir 10 as it circulates in journal zone 8, as described elsewhere in this specification.

Figure 2:
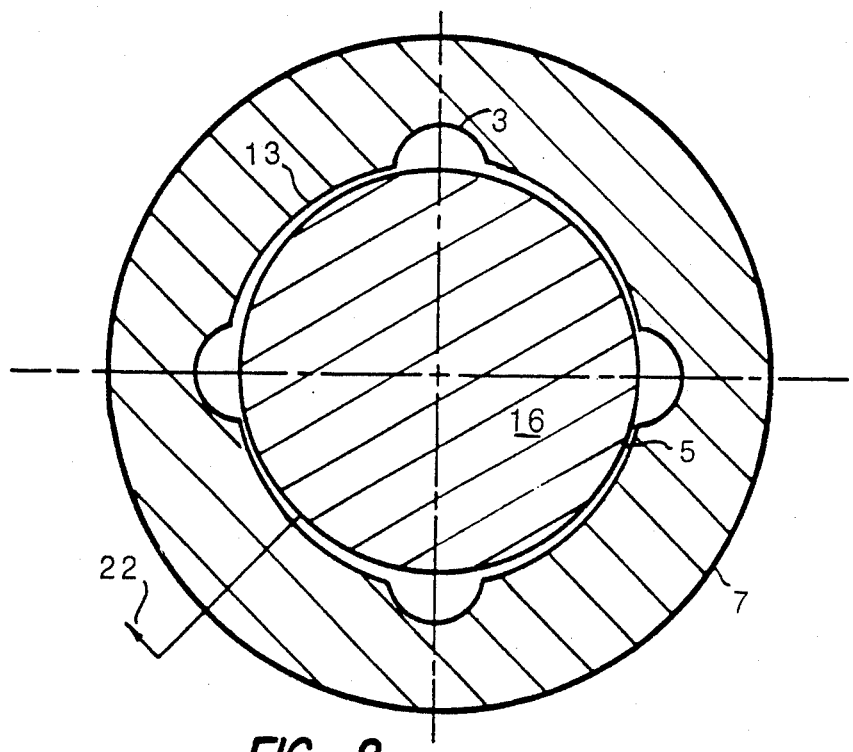
FIG. 2 shows a cross section view of the bearing housing and rotating shaft at section A—A of FIG. 1b.

Referring now to FIG. 2, the feature of journal zone 8 in cross-section have been exaggerated for clarity of illustration. Actual proportions are much smaller as indicated later in this specification. The wall of bore 5 in journal zone 8 includes four arcuate members 13 for forming four converging, wedge-like gaps with the surface of shaft 16 to pressurize oil in journal zone 8. Arcuate members 13 have radii approximately equal to the radius of bore 5. The centers of curvature of arcuate members 13 are nonconcentric with respect to themselves and axis 9 of bore 5. Thus, each arcuate member 13 is slightly inclined toward the surface of shaft 16 in a clockwise direction around the circumference of bore 5. Each end of each arcuate member 13 terminates at an oil feed groove 3.

Journal zone 8 provides the primary radial support for shaft 16 when it rotates. The cylindrical clearance between the surface of shaft 16 and arcuate members 13 in journal zone 8 is very small, being ion the order of 3 micrometers at the closest point. The hydrodynamic film of pressurized, low viscosity oil facilitates low friction rotation of, and provides radial stiffness for, shaft 16. As shaft 16 rotates within the hydrodynamic film contained within journal zone 8, it assumes a substantially centered position within the inner wall features of bore 5.

Referring to FIG. 2, as shaft 16 rotates, oil is drawn from oil-feed grooves 3 by surface adhesion to shaft 16. The oil is then compressed as it is directed into the converging, wedge-like gaps formed between the surface of shaft 16 each arcuate member 13. As the oil is so pressurized, radial stiffness of rotating shaft 16 is increased. Such radial stiffness provides substantially improved accuracy of shaft rotation while the spindle is subjected to mechanical vibration and changes in balance.

As shaft 16 rotates, some pressurized oil passes out of journal zone 8 into adjacent annular feed groove 6. Similarly, some oil also passes into lower reservoir 10 from journal zone 8. Oil is resupplied to journal zone 8 via oil feed grooves 3 from both annular feed groove 6 and lower reservoir 10.

Oil feed grooves 3 traverse the entire length of journal zone 8, extending into both annular feed groove 6 and lower reservoir 10. Oil feed grooves 3 function as channels to recirculate oil back into journal zone 8. Thus, in one recirculation path, oil passes from journal zone 8, collects in the annular feed groove 6, and is then resupplied to journal zone 8 through the oil-feed grooves 3. Similarly, a second recirculation path is established for oil passing out of journal zone 8 into lower reservoir 10, such oil being returned to journal zone 8 also via oil feed grooves 3.

As shown in FIG. 1b, the cylindrical gap of reservoir 10 is longitudinaly tapered by gradually changing the diameter of the wall of bore 5. The gap is smallest at its junction with journal zone 8. When shaft 16 is not rotating, oil is always attracted toward journal zone 8 by the surface tension of the oil in cooperation with the tapered clyindrical gap of reservoir 10. When shaft 16 is rotating, the oil in reservoir 10 will tend to remain concentrated in the smallest clearance area immediately adjacent to journal zone 8 regardless of fluctuations in the quantity of oil in reservoir 10.

Referring again to FIG. 1b, oil seal zone 4 functions to seal journal zone 8 from the outside environment.

The annular clearance between the inner wall of bore 5 and shaft 16 in oil seal zone 4 is approximately the same as exists in journal zone 8. When shaft 16 is not rotating, oil is maintained in oil seal zone 4 immediately adjacent to the oil-feed groove 6 by surface tension of the oil. When shaft 16 rotates, an equilibrium axial position of the oil is established by the pressure of oil out-flowing from journal zone 8 opposing the pressure of oil developed by the pumping action of spiral groove 15 operating in cooperationn with the inner wall of bore 5 in oil seal zone 4. Thus, as shaft 16 rotates, oil is constantly pumped from oil seal zone 4 into annular groove 6. Since the hydrodynamic bearing of the present invention is a closed system, the constant return of oil to annular groove 6 assures that lower reservoir 10 will contain sufficient volume of oil to maintain continuous supply of oil to oil feed grooves 3 (as shown in FIG. 2) and journal zone 8.

Upper reservoir 2, while comprising the same longitudinally tapered configuration, is not as deep as lower reservoir 10. When shaft 16 is not rotating, it contains oil to approximately two-thirds of its depth. However, when shaft 16 is rotating and the equilibrium axial position of the oil has been established as described above, upper reservoir 2 is empty. The volume of oil in the system tends to concentrate in lower reservoir 10 to assure adeuate supply of oil to feed grooves 3 (as shown in FIG. 2) and journal zone 8.

Housing 7 is constructed of conventional journal bearing material such as bronze, and shaft 16 is constructed of substantially harder material such as hardened steel. The oil used may be any suitable low viscosity lubricant, preferably silicone.

The diameters of bore 5 and shaft 16 are 6.0085 mm and 6.0025 mm, respectively, to provide an annular gap of approximately 3 micrometers. The converging wedge-like gaps formed by the inclination of arcuate members 13 with respect to the surface of shaft 16 vary continuously from a minimum of approximately 3 to a maximum approximately 9 micrometers.

The depth of oil feed annular groove 6 is about 0.25 mm and 0.19 mm, respectively. The taper associated with upper and lower reservoirs 2 and 10 is 7.8° and 3.9°, respectively. Thus, the reader is reminded that the relative dimensions of these features of the invention were exaggerated in the drawing for illustrative purposes only.

Direction of rotation 22 for shaft 16 is shown clockwise for the preferred embodiment of the present invention. It should be noted, however, direction of rotation 22 can be counterclockwise if the inclination of spiral grooves 15 and of arcuate member 13 are reversed.

What is claimed is:

1. A hydrodynamic bearing comprising:

a rotatable shaft;

a housing having a bore for receiving said rotatable shaft, said bore having a bore wall forming an annular gap between the surface of said rotatable shaft and said bore wall;

said annular gap having a journal zone for containing and, in response to rotation of said rotatable shaft, pressurizing lubricant to lubricate and to provide radial stiffness for said rotatable shaft when said rotatable shaft is rotating, said rotatable shaft being substantially centered within said annular gap when said rotatable shaft is rotating;

said annular gap having a reservoir adjoining one end of the journal zone for continuously supplying lubricant to and continuously receiving lubricant from said journal zone when said rotatable shaft is rotating; and said bore wall being longitudinally tapered from one end of said annular gap to said one end of the journal zone defining a conical gap between the surface of said rotatable shaft and said bore wall, the width of said gap between said bore wall and the surface of said rotatable shaft being such that said lubricant is always attracted toward said journal zone by the surface tension of said lubricant in cooperation with said conical gap when said rotatable shaft is not rotating, said conical gap comprising said reservoir.

* * * * *

UNITED STATES PATENT AND TRADEMARK OFFICE
CERTIFICATE OF CORRECTION

PATENT NO. : 4,726,693

DATED : February 23, 1988

INVENTOR(S) : James C. Anderson and Roger R. Sleger

It is certified that error appears in the above-identified patent and that said Letters Patent is hereby corrected as shown below:

Column 2, line 3 of the Patent, delete "feature", insert --features--.

Column 2, line 21 of the Patent, delete "ion", insert --on--.

Column 3, line 10 of the Patent, delete "cooperationn", insert --cooperation--.

Column 3, line 27 of the Patent, delete "adeuate", insert --adequate--.

Column 3, line 41 of the Patent, after "feed", insert --grooves 3 and--.

Signed and Sealed this

Twenty-second Day of November, 1988

Attest:

DONALD J. QUIGG

*Attesting Officer*  *Commissioner of Patents and Trademarks*